United States Patent Office 2,942,715
Patented June 28, 1960

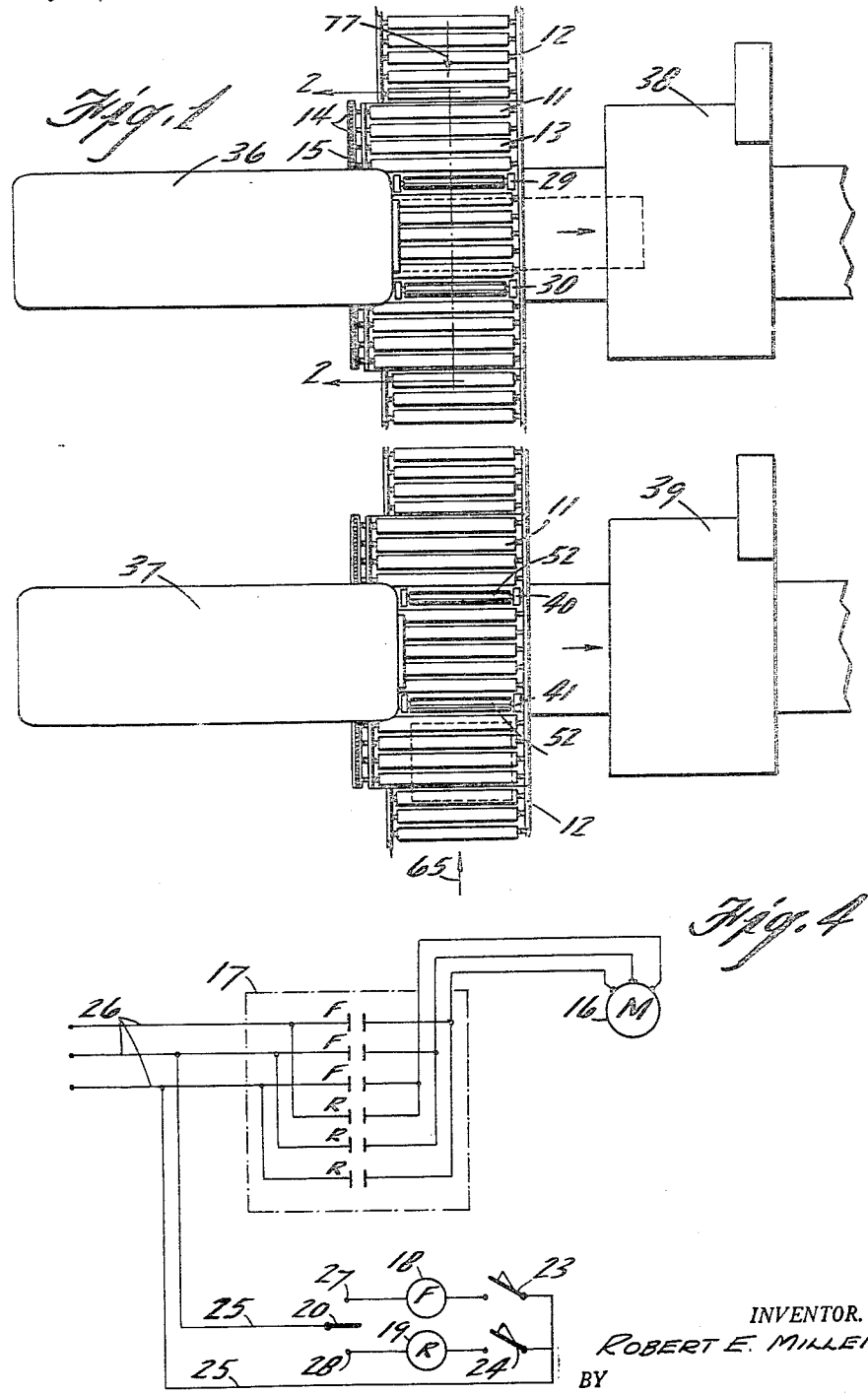

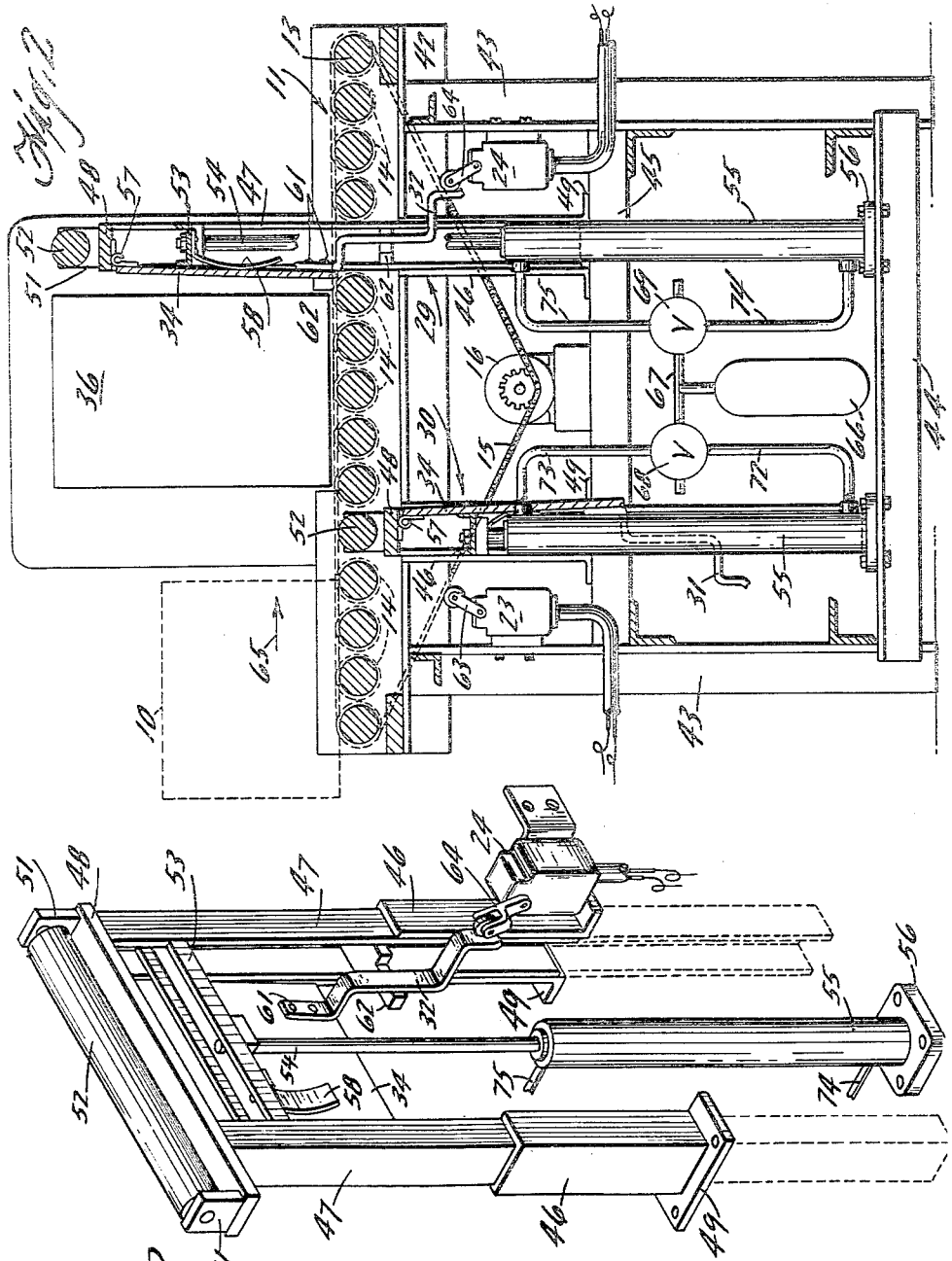

2,942,715

CONVEYOR AND WORKPIECE STOP MECHANISM

Robert E. Miller, Milwaukee, Wis., assignor to The Journal Company, Milwaukee, Wis., a corporation of Wisconsin Filed May 16, 1957, Ser. No. 659,597

6 Claims. (Cl. 198—19)

This invention relates to a conveyor and workpiece stop mechanism.

The device of the present invention is an improvement on the devices shown in United States patents to J. J. Eberle, Nos. 2,630,750 and 2,684,626. In the devices of said patents a pusher or deflector mechanism is adapted to receive workpiece bundles from one side only. In the device of the present invention workpieces may be delivered to the pusher or deflector mechanism from either side thereof and a plurality of sets of pushers and workpiece utilizing machines can be incorporated in a conveyor system in which workpieces can be selectively delivered to one or another of said sets at the option of the operator.

In the device of the present invention each pusher is served by a conveyor having runs approaching the pusher from two directions and is provided with two elevatable and retractable workpiece stops disposed beneath the conveyor and at both sides of the pusher. When retracted the stops do not interfere with passage of workpieces thereover. However, when a stop which is on the far side of the pusher with respect to the direction of travel of the workpiece is elevated, it will arrest the movement of the workpiece and hold it in front of the pusher. Switching mechanism is provided whereby workpiece pressure on an elevated stop will trigger pusher and conveyor mechanism which will cause lateral deflection of the arrested workpiece from the conveyor.

The apparatus of the present invention increases the flexibility of use of the conveyor and workpiece utilizing machines as any workpiece can be selectively stopped in front of any pusher, regardless of the direction of workpiece travel.

Other objects and advantages of the invention will be more apparent upon an examination of the following disclosure in which:

Fig. 1 is a plan view diagrammatically showing apparatus embodying the present invention.

Fig. 2 is an enlarged cross section taken along the line 2—2 of Fig. 1.

Fig. 3 is a fragmentary enlarged perspective view of a typical workpiece stop mechanism, shown disassocated from the conveyor and pusher mechanism.

Fig. 4 is a simplified circuit diagram schematically showing control of the motor which drives the conveyor section immediately to the front of a pusher.

While the invention is not limited to a bundle tying machine feeder of the types shown in the prior patents aforesaid, the specific embodiment of the invention herein illustrated is adapted for application to such a feeder. Inasmuch as the present invention is limited to the workpiece stops and their cooperation with the conveyor and pusher mechanism, the general and specific features of the devices shown in the prior patents aforesaid will not be repeated here but are incorporated herein by reference.

Workpieces 10 which may consist of stacked newspapers destined to be tied in tying machines 38, 39 are delivered on power driven conveyors 12 to the separate power driven conveyor sections 11 which are individual to each pusher 36, 37. As in the prior patents aforesaid each power driven conveyor section 11 comprises rollers 13 having end sprockets 14 over which the chain 15 is trained, the chain being driven by the motor 16. In the device of the present invention the motor is adapted to be energized to rotate in either forward or reverse direction through a conventional reversing contactor assembly shown at 17 in Fig. 4. The reversing contactor assembly 17 is controlled by the respective forward and reverse contactor actuating relays 18, 19, these relays being in circuit with master selector switch 20 and workpiece stop actuated switches 23, 24. The relays 18, 19 derive power from the control power line 25 tapped from the main polyphase power line 26.

When selector switch 20 is closed on contact point 27, forward relay 18 is normally energized to rotate rollers 13 of conveyor 11 in one direction. When master selector switch 20 is positioned on contact point 28, the reverse relay 19 is normally energized to rotate rollers 13 of conveyor 11 in the opposite direction.

Switches 23, 24 are normally closed and are positioned as best shown in Fig. 2 for actuation by switch actuators 31, 32 mounted on yieldable stop plates 34 of the respective paired workpiece stops 29, 30 and 40, 41 which are respectively mounted beneath the conveyor 11 on both sides of the respective workpiece pushers 36, 37. As in the devices of the prior patents aforesaid, the pushers or deflectors are adapted to deflect workpiece bundles 10 from the conveyor into bundle tying machines indicated diagrammatically at 38, 39 of Fig. 1. In Fig. 1 of the drawing two sets of pushers 36, 37 and bundle tying machines 38, 39 are illustrated for exemplification. Additional sets of pushers, bundle tying machines and workpiece stops can be added at the option of the user.

Switches 23, 24 also control actuation of the mechanism of the pusher 36. Actuation of one or the other of said switches will energize the pusher 36 to push a workpiece aligned therewith laterally into the bundle tying machines 38 and thereupon trigger the operation of the bundle tying mechanisms, all as shown in the prior patents aforesaid. For the apparatus and circuitry for this operation, reference is made to the prior patents aforesaid.

As best shown in Fig. 2 each conveyor 11 is mounted on a framework which includes side rails 42 in which the rollers 13 are journaled, uprights 43, bottom cross brace 44 and intermediate cross brace 45. The intermediate cross brace 45 has mounted thereon channel members 46 having flanged feet 49 bolted to the cross member 45. Telescopically movable within the channel members 46 are stop frame side rail channel members 47. The upper ends of the upright members 47 are cross tied by a top rail 48 upon which upstanding bearing ears 51 are fastened for the rotatable support of idler roller 52 which is disposed at the level of rollers 13 of the conveyor 11 when the stop is retracted, stop 30 being illustrative of this position in Fig. 2.

The channel-shaped upright frame members 47 are further cross connected below cross member 48 by channel-shaped cross member 53 to the midpoint of which is anchored the piston rod 54 of pneumatic motor 55. The base of the pneumatic motor 55 is mounted by means of its flanged foot 56 to base member 44 of the unit frame.

As hereinbefore indicated each stop has a pressure plate 34 which is free for limited swinging movement about its connection to cross member 48 on hinge pintle 57. The plates 34 on paired stops 29, 30 and 40, 41 are biased toward each other by leaf springs 58 mounted on cross members 53. To the lower margins of the respective pressure plates 34 of paired stops 29, 30, switch actuator arms 32, 31 are connected by means of the bolts 61 or the like. Corresponding portions of the switch actuator arms engage stop lugs 62 extending from corresponding upright frame members 47 to limit movement of the plates 34 under bias of the springs 58.

The switches 23, 24 shown in the circuit diagram of Fig. 4 are fixedly mounted on the upright members 43 of the conveyor frame and have roller actuator arms 63, 64 which are aligned with the respective actuator arms 31, 32 when the stops are elevated but are misaligned with respect to said actuator arms when the stops are retracted.

As shown in Fig. 2, elevated stop 29 is in position to arrest the movement of the workpiece bundle 10 traveling in the direction of arrow 65. The workpiece bundle will simply pass over retracted stop 30, the roller 52 thereof rotating idly beneath the bundle.

The respective stops 29 and 30 are selectively raised and lowered by means of the pneumatic apparatus diagrammatically shown in Fig. 2. A source of air pressure, such as tank 66, supplies air pipe 67 which is connected to both valves 68, 69. The valves are conventional in structure and selectively supply air lines 72, 73 for air valve 68 and air lines 74, 75 for valve 69 whereby the respective pneumatic motors 55 for each of the stops 30 and 29 are selectively and independently elevated and lowered under manual control of the operator. Stops 40, 41 in the plural system shown in Fig. 1 are similarly provided with pneumatic control apparatus for selectively and independently raising and lowering each such stop.

If workpiece bundles are being supplied in the direction of arrow 65 in Fig. 1, such bundles can be arrested in front of either of the pushers 36, 37 by appropriately setting the stops 29, 30, 40, 41. The bundle can be arrested in front of pusher 37 if stop 40 is elevated and stop 41 is lowered. Under these circumstances the master selector switch 20 for the conveyor 11 associated with pusher 37 would be set to drive the conveyor in the direction of arrow 65. As soon as a bundle exerts pressure on the pressure plate of stop 40, the appropriate switch 23, 24 will be opened to de-energize the conveyor and initiate a series of pusher and bundle tying machine actions as outlined in the prior patents aforesaid.

If it is desired to bypass pusher 37 in favor of pusher 36, all of stops 30, 40 and 41 will be retracted and stop 29 will be elevated. Accordingly, workpiece bundles proceeding along the conveyor in the direction of arrow 65 will collect in front of pusher 36 to be deflected therefrom into bundle tying machine 38.

Conversely bundles traveling in the direction of arrow 77 may be positioned either in front of pusher 36 or in front of pusher 37 by selective positioning of the respective stops aforesaid.

If bundles are being fed in the directions of both arrows 65 and 77, stops 29 and 41 will be retracted and both of stops 30 and 40 will be elevated. Accordingly, workpiece bundles traveling in the direction of arrows 65 will be arrested in front of pusher 37 and workpiece bundles traveling in the direction of arrow 77 will be arrested in front of pusher 36.

In practice the pusher rams have a width substantially the same as the width of the bundles. The side of the ram will act as an abutment to arrest such bundles as arrive at a pusher when the ram is extended. On retraction of the ram, conveyor 11 will advance the first arrested bundle into alignment with the ram.

From the foregoing it is clear that the device of the present invention adds considerable flexibility to the operation of bundle tying and feeding machines by making it possible to direct bundles traveling from either direction along the conveyor 12 to any of a plurality of sets of pushers, stops and bundle tying machines. As aforesaid, the features of the present invention are broadly applicable to any conveyor system.

I claim:

1. In a device of the character described, the combination with a workpiece transfer mechanism, a conveyor adjacent the transfer mechanism and from which said transfer mechanism is adapted to discharge workpieces laterally, said conveyor having runs approaching said transfer mechanism from two directions, of two advanceable and retractable stops, one at each side of the transfer mechanism and means to discriminate between workpieces on one or the other of said conveyors by selectively advancing one stop and retracting the other stop into positions in which the advanced stop blocks travel to said transfer mechanism of workpieces on the conveyor run toward which said advanced stop is disposed and the retracted stop is clear of travel to said transfer mechanism of workpieces on the other conveyor run whereby only workpieces on the other conveyor run can travel to said transfer mechanism, including means for reversing the positions of said stops to reverse the directions from which the workpieces can travel to the transfer mechanism, in further combination with workpiece handling mechanism and means for controlling said workpiece handling mechanism pursuant to pressure of said workpiece against one of said stops, said workpiece handling mechanism being provided wtih a control circuit including two switches, one for each stop, each of said stops being provided with a switch actuator for its switch.

2. The device of claim 1 in further combination with means for mounting said stops and on which said stops have relative movement with respect to said switches, each said switch actuator being aligned with its switch when its stop is advanced and misaligned with its switch when its stop is retracted.

3. In a device of the character described, including a conveyor and a pusher for deflecting workpieces disposed on said conveyor laterally therefrom, and a workpiece handling mechanism including a circuit having a switch, an elevatable and retractable workpiece stop disposed beneath the conveyor and comprising an upright frame, means for elevating said stop above the level of said conveyor to arrest the movement of workpieces traveling therealong, said stop comprising a frame having an upper rail, and means forming a switch actuator for actuating a switch under pressure of a workpiece arrested by said stop and comprising a plate hingedly mounted to said rail and depending therefrom into the path of workpieces traveling on said conveyor, resilient means biasing said plate against the direction in which workpiece pressure is exerted, whereby to hold said switch actuator away from said switch but which is yieldable under pressure of said workpiece to permit engagement of the switch actuator with the switch.

4. The device of claim 3 in which the means for elevating and lowering the stop comprises a double acting fluid operated motor having control means for selectively raising and lowering the stop.

5. In combination with a conveyor having a plurality of lateral workpiece receiving means to which workpieces traveling along said conveyor are selectively deflected and a like plurality of transfer mechanisms for deflecting such workpieces to said means, of stop means for arresting the movement of said workpieces to position such workpieces in front of one or another of said transfer mechanisms regardless of the direction of travel of said workpieces on said conveyor, said stop means comprising for each said pusher two advanceable and retractable stops, one at each side of said transfer mechanism and means selectively advancing and retracting said stops to permit passage of said workpiece beyond said transfer mechanism when both stops are retracted and to arrest such workpiece in alignment with said transfer mechanism when one of said stops is advanced.

6. The device of claim 5 in further combination with workpiece handling machine individual to each transfer mechanism and means for controlling the operation of said machine pursuant to workpiece pressure on an advanced stop, said machine including a control circuit having a switch, said stop having a switch actuator operatively associated with said switch in the advanced position of the stop.

References Cited in the file of this patent
UNITED STATES PATENTS

| | | |
|---|---|---|
| 1,856,733 | Shepherd | May 3, 1932 |
| 2,630,750 | Eberle | Mar. 10, 1953 |
| 2,762,487 | Temple | Sept. 11, 1956 |